United States Patent
Su et al.

(10) Patent No.: US 7,506,675 B2
(45) Date of Patent: Mar. 24, 2009

(54) SAFETY TIRE INCLUDING COMPOSITE SHEET WITH CONFINED FLEXIBILITY

(76) Inventors: Lifeng Su, 3122 Stockbridge Dr., Stow, OH (US) 44224; Qi Gao, 3122 Stockbridge Dr., Stow, OH (US) 44224

(*) Notice: Subject to any disclaimer, the term of this patent is extended or adjusted under 35 U.S.C. 154(b) by 264 days.

(21) Appl. No.: 10/864,180

(22) Filed: Jun. 9, 2004

(65) Prior Publication Data

US 2005/0008843 A1 Jan. 13, 2005

Related U.S. Application Data

(60) Provisional application No. 60/477,072, filed on Jun. 9, 2003.

(51) Int. Cl.
- B60C 17/00 (2006.01)
- B60C 13/00 (2006.01)
- B60C 19/12 (2006.01)

(52) U.S. Cl. .............. 152/197; 152/201; 152/454; 152/516; 152/517; 152/543; 152/555

(58) Field of Classification Search .............. 152/201
See application file for complete search history.

(56) References Cited

U.S. PATENT DOCUMENTS

| | | | |
|---|---|---|---|
| 895,821 A * | 8/1908 | Wilmot, Jr. | |
| 908,488 A * | 1/1909 | Newell | 152/199 X |
| 913,752 A * | 3/1909 | Moran | 152/196 |
| 978,731 A * | 12/1910 | Gautier | 152/201 X |
| 1,100,810 A * | 6/1914 | Wood | 152/199 |
| 1,105,880 A * | 8/1914 | Cooper | 152/201 X |
| 1,130,578 A * | 3/1915 | Dees | 152/545 X |
| 1,138,315 A * | 5/1915 | Ratterree | 152/199 |
| 1,139,807 A * | 5/1915 | Rothenberger | 152/198 |
| 1,143,265 A * | 6/1915 | Gautier | 152/201 |
| 1,166,861 A * | 1/1916 | Simons | 152/198 |
| 1,192,554 A * | 7/1916 | Nielsen | 152/196 |
| 1,194,253 A * | 8/1916 | Stump | 152/201 |
| 1,247,560 A * | 11/1917 | Meyers et al. | 152/199 |
| 1,300,731 A * | 4/1919 | Kaplan | 152/196 |
| 1,425,812 A * | 8/1922 | Turek | 152/201 |
| 1,434,571 A * | 11/1922 | Trost | 152/201 |
| 3,830,272 A * | 8/1974 | Monzini | 152/201 |

FOREIGN PATENT DOCUMENTS

| | | | | |
|---|---|---|---|---|
| AT | 38336 | * | 8/1909 | 152/196 |
| CH | 264797 | * | 2/1950 | 152/197 |
| FR | 522100 | * | 7/1921 | 152/196 |
| GB | 256448 | * | 8/1926 | 152/198 |

* cited by examiner

*Primary Examiner*—Adrienne C Johnstone

(57) ABSTRACT

A composite sheet has confined flexibility and is used in a safety pneumatic tire which is self-supporting under zero inflation pressure. The composite sheet comprises a matrix of high modulus solid objects, low modulus material, and optionally a matrix of cords, the high modulus solid objects being assembled to form a mechanism which allows the composite sheet to bend easily within predetermined ranges and confines the composite sheet from further bending when the limits of the predetermined ranges are reached. The safety pneumatic tire comprises a pair of the composite sheets disposed at sidewall regions under a carcass and/or a layer of the composite sheet disposed above a belt package. A method of making the composite sheet includes forming a chain of the high modulus solid objects having a desired locking position.

9 Claims, 13 Drawing Sheets

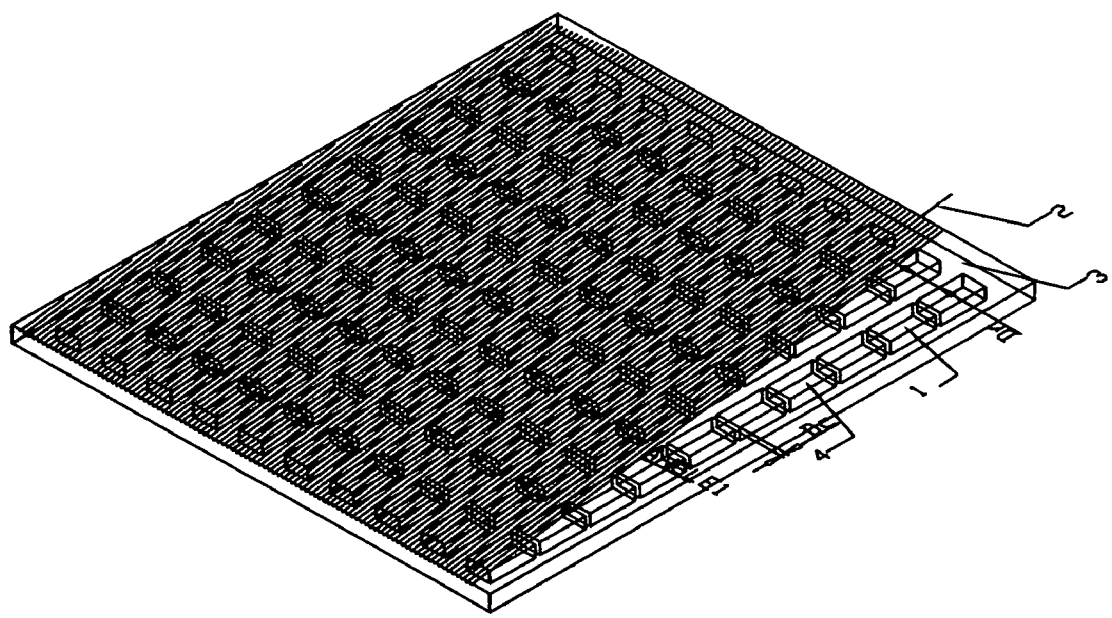
Figure 1-a

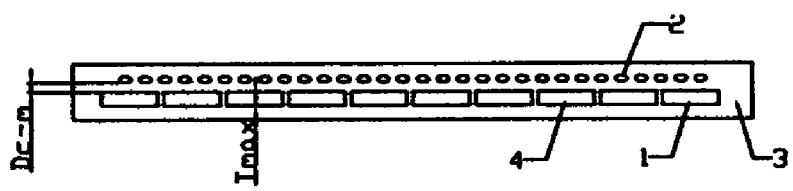
Figure 1-c
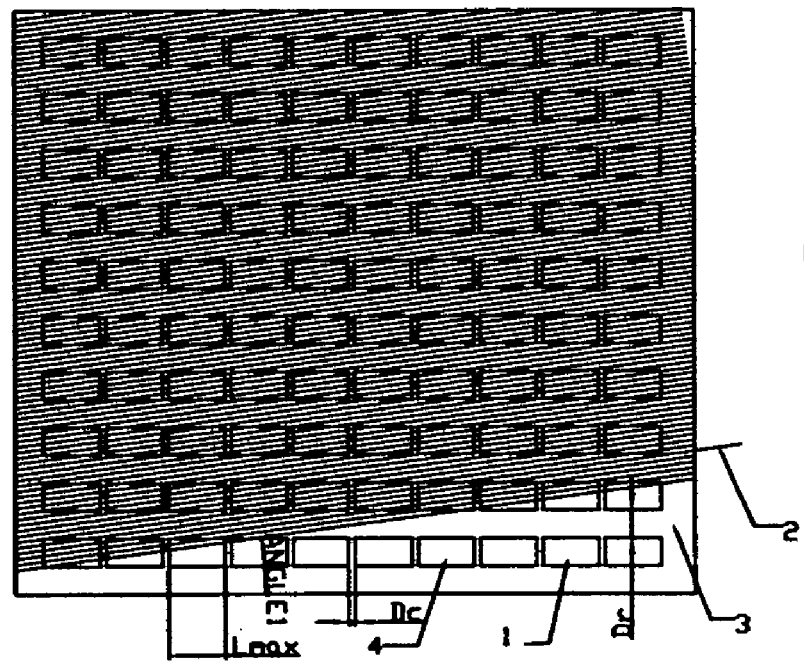
Figure 1-b

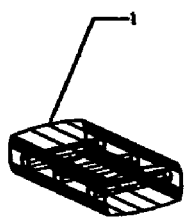
Figure 2-d
Figure 2-c
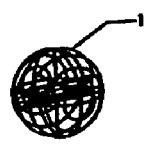
Figure 2-b
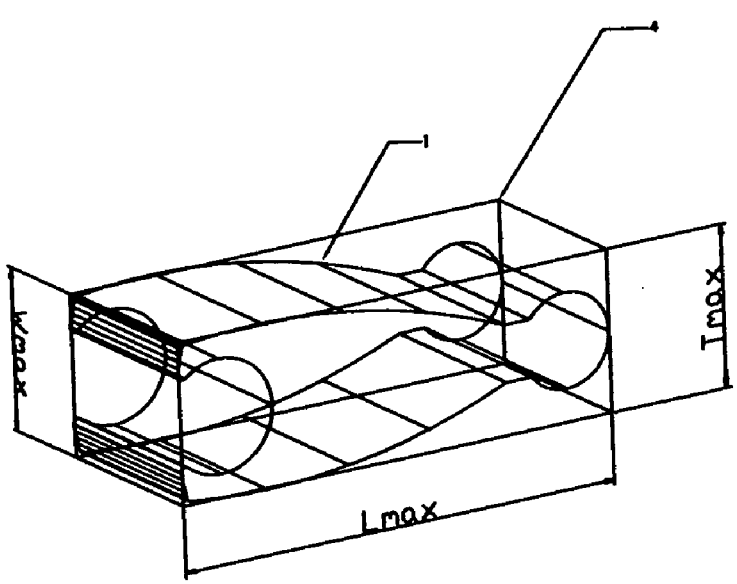
Figure 2-a

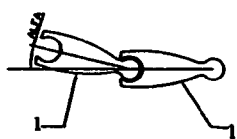
Figure 3-c
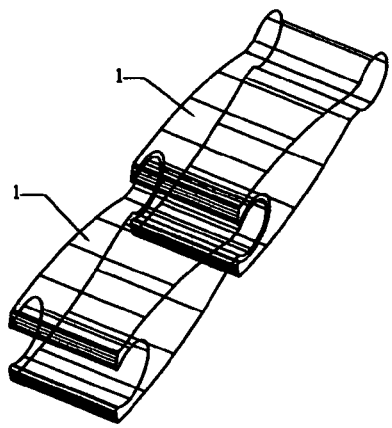
Figure 3-d
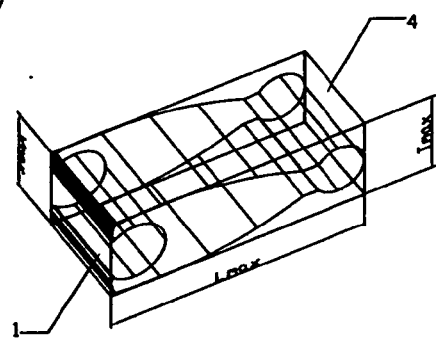
Figure 3-e
Figure 3-b
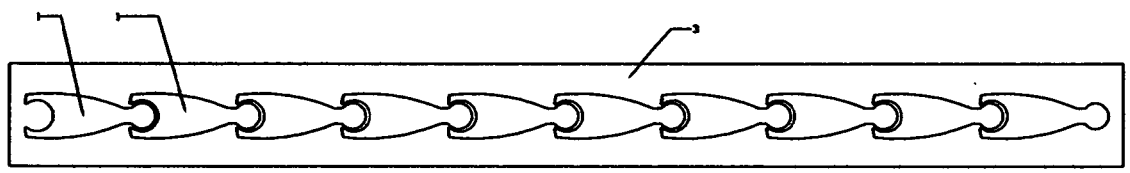
Figure 3-a

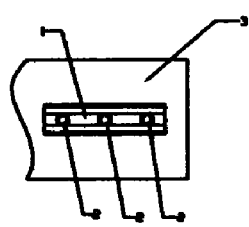
Figure 6-b
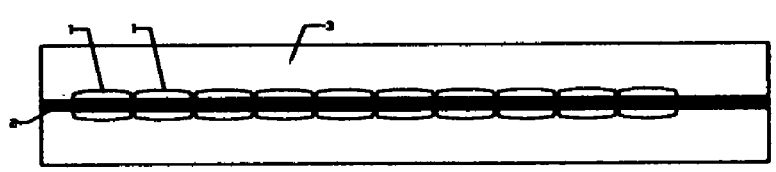
Figure 6-a
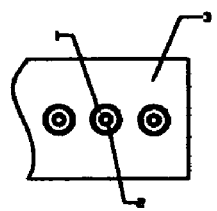
Figure 5-b
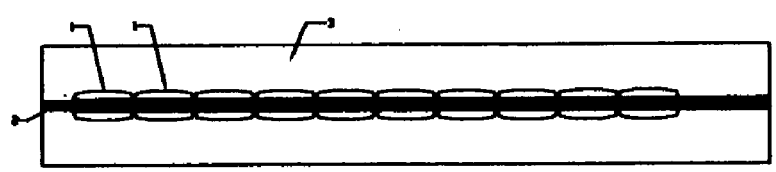
Figure 5-a
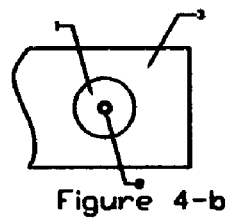
Figure 4-b
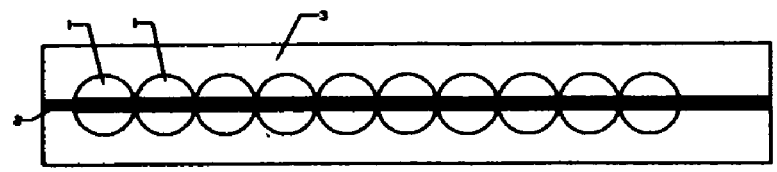
Figure 4-a

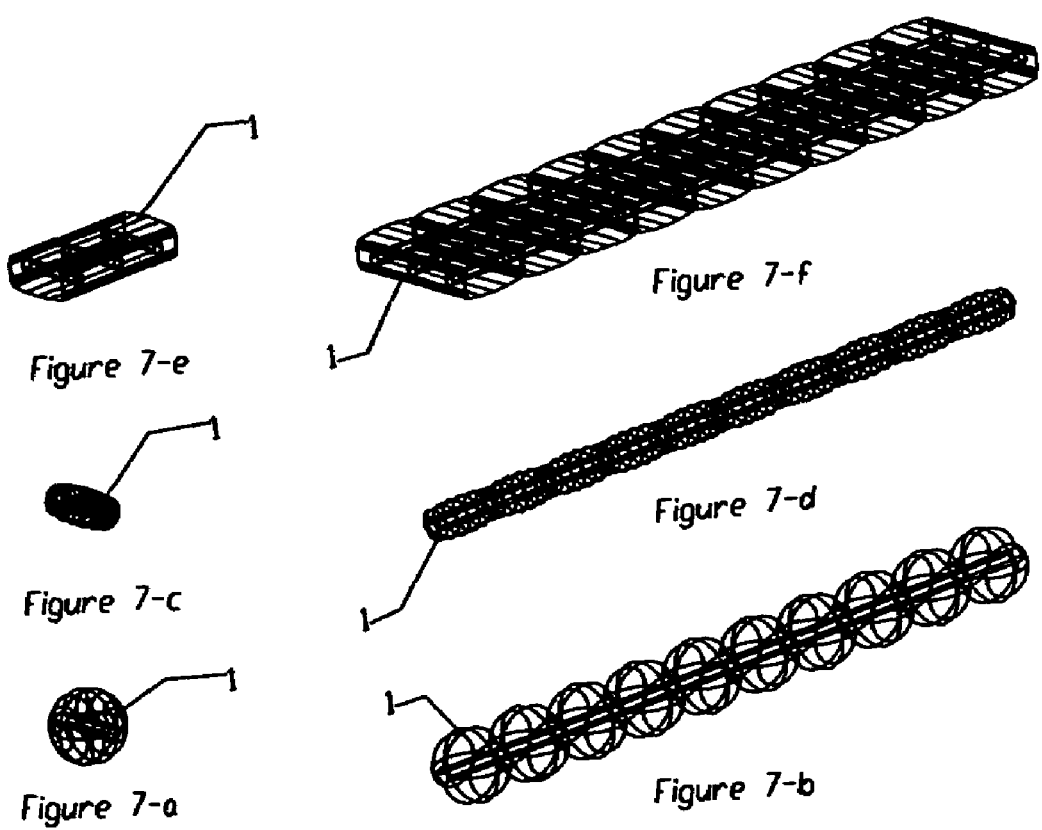

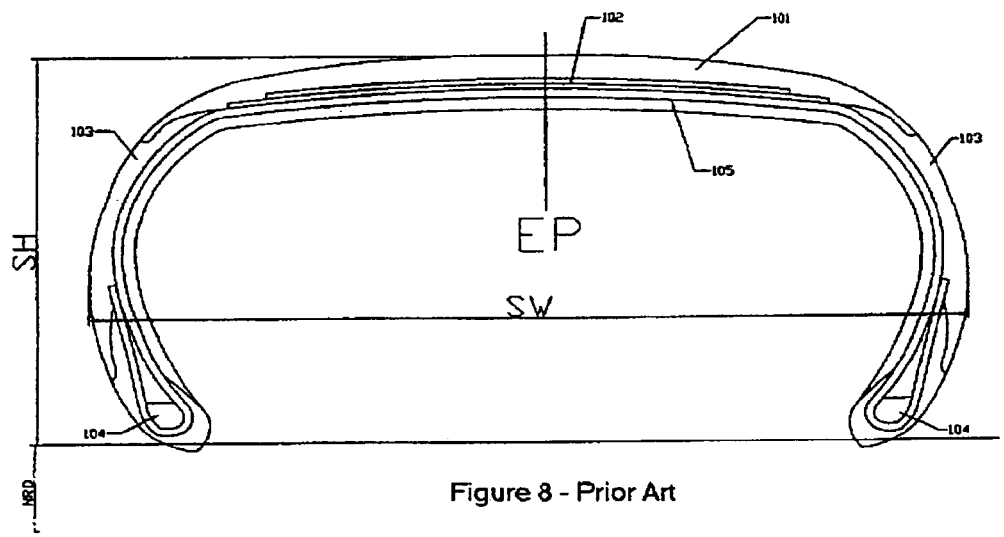
Figure 8 - Prior Art

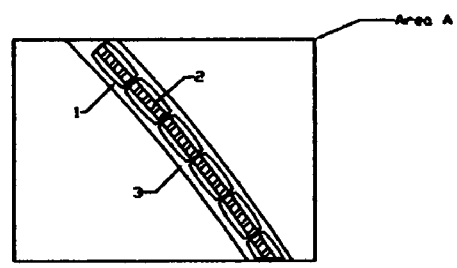
Figure 10-b
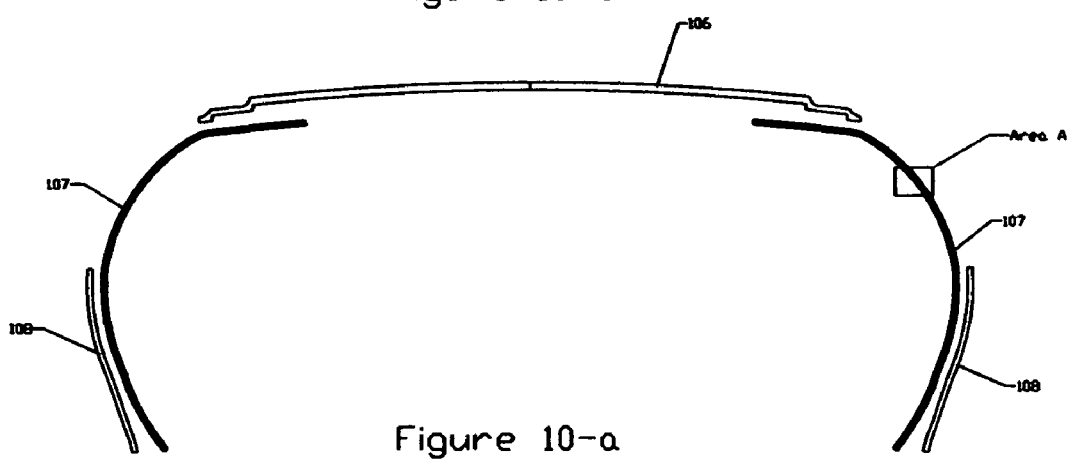
Figure 10-a

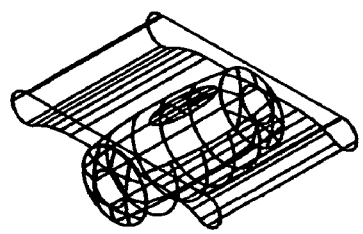
Figure 13-b
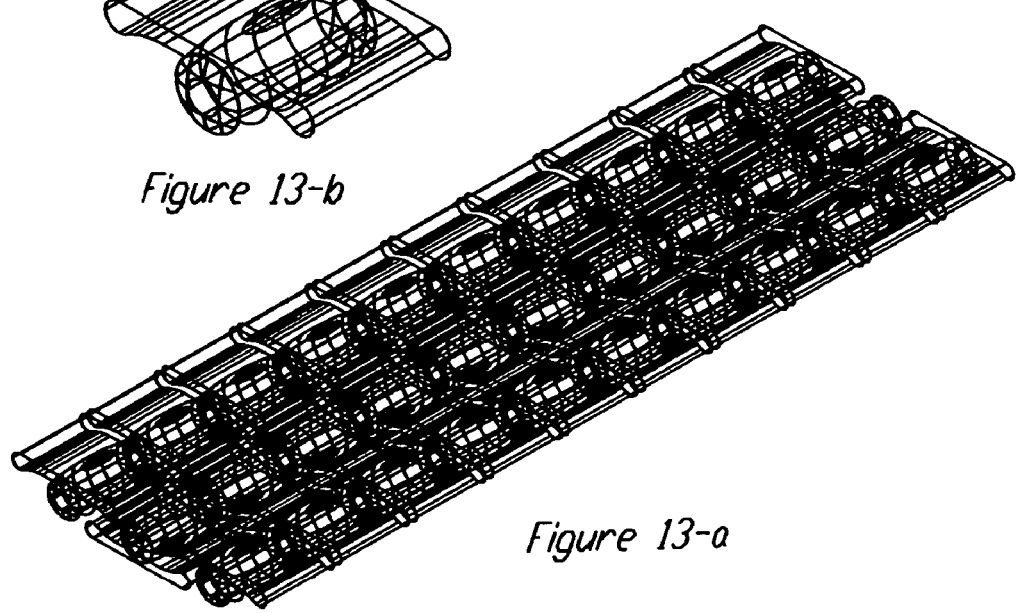
Figure 13-a

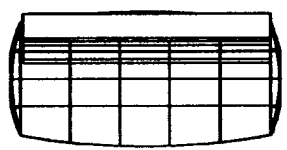
Figure 14-a
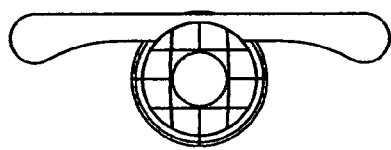
Figure 14-b
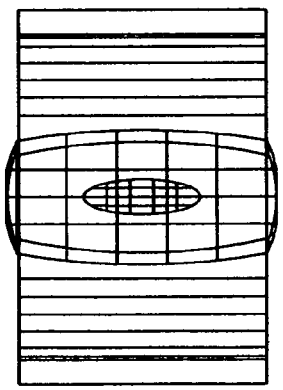
Figure 14-c

SAFETY TIRE INCLUDING COMPOSITE SHEET WITH CONFINED FLEXIBILITY

CROSS-REFERENCE TO RELATED APPLICATIONS

This application claims the benefit of PPA Ser. No. 60/477,072, filed 2003 Jun. 9 by the present inventors.

FEDERALLY SPONSORED RESEARCH

Not Applicable

SEQUENCE LISTING OR PROGRAM

Not Applicable

DEFINITION OF TERMINOLOGY

1. "locking position of stiff object": when a group of external forces apply to two immediately adjacent stiff objects, the two objects can relatively move easily until they are positioned in such a way that further movement cause significant increment of stress inside their bodies. And, therefore, the high resistance to further body movements starts being mobilized from two stiff objects. This extreme position is called the locking position of the two stiff objects to this group of external forces. Different group of external forces will generate different form of relative movements of the two stiff objects. As a result, different group of external forces has its own locking position to the same pair of stiff objects.

2. "locking position of chain of stiff objects": when a group of external forces apply to a chain of stiff objects, the sub-piece of chain can relatively move easily until they are positioned in such a way that further movement cause significant increment of stress inside their bodies. And, therefore, the high resistance to further body movements starts being mobilized from these stiff objects. This extreme position and shape of chain is called the locking position/shape of chain to this group of external forces. Different group of external forces will generate different form of relative movements of the chain of stiff objects. As a result, different group of external forces has its own locking position to the same chain of stiff objects.

3. "locking position of composite sheet of present invention": when a group of external forces apply to the composite sheet, the composite sheet can deform quite flexibly until the stiff objects of composite sheet are positioned in such a way that further movement cause significant increment of stress inside their bodies. And, therefore, the high resistance to further body movements starts being mobilized from these stiff objects. This extreme position and shape of composite sheet is called the locking position/shape of composite sheet to this group of external forces. Different group of external forces will generate different form of deformed shape of composite sheet. As a result, different group of external forces has its own locking position to the same composite sheet of present invention.

4. "relax status of composite sheet of present invention": when a composite sheet is not in locking position to a group of external forces, we call the composite sheet is in relax status to said group of external forces.

5. "width, length and thickness of stiff object inside the composite sheet": the maximum dimension of stiff object along the thickness direction of composite sheet is the thickness of stiff object. The maximum dimensions of stiff object along two stiff object matrix directions (column direction and row direction) are called width of stiff object and length of stiff object, respectively. FIG. 2-a gives an example.

6. "Aspect Ratio" means the ratio of its section height to its section width.

7. "Axial" and "axially" means the lines or directions that are parallel to the axis of rotation of the tire.

8. "Bead" or "Bead Core" means generally that part of the tire comprising an annular tensile member, the radially inner beads are associated with holding the tire to the rim being wrapped by ply cords and shaped, with or without other reinforcement elements such as flippers, chippers, apexes or fillers, toe guards and chaffers.

9. "Circumferential" means lines or directions extending along the perimeter of the surface of the annular tread perpendicular to the axial direction.

10. "Equatorial Plane (EP)" means the plane perpendicular to the tire's axis of rotation and passing through the center of its tread.

11. "Footprint" means the contact patch or area of contact of the tire tread with a flat surface at zero speed and under normal load and pressure.

12. "Innerliner" means the layer or layers of elastomer or other material that form the inside surface of a tubeless tire and that contain the inflating fluid within the tire.

13. "Normal inflation pressure" means the specific design inflation pressure and load assigned by the appropriate standards organization for the service condition for the tire.

14. "Normal Load" means the specific design inflation pressure and load assigned by the appropriate standards organization for the service condition for the tire.

15. "Ply" means a layer of rubber-coated parallel cords.

16. "Radial Ply Tire" means a belted or circumferentially-restricted pneumatic tire in which at least one ply has cords which extend from bead to bead are laid at cord angles between 65 degree and 90 degree with respect to the equatorial plane of the tire.

17. "Section Height" means the radial distance from the nominal rim diameter to the outer diameter of the tire at its equatorial plane.

18. "Section Width" means the maximum linear distance parallel to the axis of the tire and Between the exterior of its sidewalls when and after it has been inflated at normal pressure for 24 hours, but unloaded, excluding elevations of the sidewalls due to labeling, decoration or protective bands.

19. "Shoulder" means the upper portion of sidewall just below the tread edge.

20. "Sidewall" means that portion of a tire between the tread and the bead.

BACKGROUND OF THE INVENTION

1. Field of the Invention

The present invention relates to a composite sheet and a pneumatic tire, and more particularly to a pneumatic tire having high puncture resistance and excellent stability and maneuverability even under zero inflation pressure.

2. Description of the Related Art

The composite sheet of present invention is an improvement to ply sheet. Ply sheet has high tensile modulus along its cord direction but low bending stiffness and, it can only bear small compression load. The flexibility of ply sheet makes it very easy to be formed to a double curvature surface of desirable shape. It is widely used in structure that defines partial or whole surface of a confined air chamber. Tire and hose are good examples of this type of industry applications. This type of structure can tolerate large deformation and absorb vibration. However, the structure depends on internal inflation pressure to form a stable condition to bear the large working load. When inflation pressure is lost for some reason, the structure becomes unstable and the working load has to be passed to adjacent structure. Among other drawbacks of this type of structure are puncture/cut prone and low compression load bearing ability.

In recent years, many so-called run-flat tires have been patented. They can be categorized as three types: the first type is to add crescent shape reinforcing rubber layer and/or reinforcing cord layer at sidewall portions and/or tread portion (U.S. Pat. No. 6,209,604); the second type is to add safety insert to the rim assembly(U.S. Pat. No. 6,039,099); the third type is to embed metallic rings at tire shoulder portions or at tire crown potion (U.S. Pat. No. 6,276,416).

In the first type of run-flat tire, the thickness of rubber at sidewall portion has been greatly increased in order to provide sufficient support to tire under flat tire condition. As a result, the ride comfort and heat buildup inside tire and deterioration in dynamic tire performance under normal condition become trade-offs in this type of tire.

In the second type of run-flat tire (tire, safety insert and rim assembly), tire will lay flat on the safety insert with loss of inflation pressure. In this flat tire situation, tire sidewall portion can carry little load and most of load is transferred through the contact between tire tread and road and the contact between tire inner surface and safety inserts. As a result, the tire handling ability becomes hard to predict under flat tire condition, especially when vehicle is cornering.

The third type of run-flat tire is almost impractical. It is hard to find any metallic material to make a ring which can tolerate such cyclic large deformation which tire has experienced at normal working condition. Further more, this type of tire is unstable under flat tire condition since flexible tire structure is not capable of transferring the load between rings and rim under this condition.

In some previous US patents, people claimed achieving certain improvement of puncture resistance of ply by selecting different construction of cord and even by replacing cord with cable (a structure comprises of several twist cords). In their claimed methods, bigger diameter size of filaments was selected and, as a result, the larger bending stiffness of the cord is obtained. However, the increment of bending stiffness of cord is undesirable in some engineering applications. Further more, the improvement of puncture resistance of the ply structure in those patented inventions is not sufficient to prevent the failure of the structure in most cases.

SUMMARY OF THE INVENTION

Present invention resolves the aforementioned problems relating to ply sheet by adding high modulus solid objects into composite sheet, or, by replacing cords with high modulus solid objects in composite sheet. The composite sheet of present invention comprises a matrix of high modulus solid objects, low modulus material and, optionally, a matrix of cords. Said high modulus solid objects are assembled to form a mechanism to allow composite sheet have confined flexibility. When composite sheet deforms to predetermined shapes, said mechanism enters into locking position and mobilizes its high resistance to the further movement of the composite sheet.

Said high modulus solid object may be made of metal, glass-fiber, polymer, or other high modulus material (term stiff object is used to represent high modulus solid object and is referred interchangeably with "high modulus solid object" in the context below). Said low modulus material may be rubber, or, similar material which can endure high deformation and has high tear strength (rubber is used to represent low modulus material and is referred interchangeably with "low modulus material" in the context below). Said optional cord is one of reinforcing stands, which comprises of high modulus helix filaments. The said rubber material fill the space left out between said stiff objects and said optional cords and embeds said stiff objects and said optional cords to make smooth surface of the composite sheet of present invention. The composite sheet of present invention need cure to gain stable engineering properties.

The composite sheet of present invention has highly non-linear characters against the structure movements at different ranges. Said composite sheet achieves aforementioned characters by utilizing the dramatically different features of its components at different situations. The sizes of stiff objects are much bigger than the diameter of the filament of cord. As a result, said stiff objects are capable of bearing large load individually and have significantly high resistance to puncture and cut. On the other hand, the sizes of stiff objects are much smaller than the length and width of composite sheet. Said stiff objects and cords (if used) are surrounded by rubber.

When composite sheet deforms within predetermined ranges, said stiff objects usually only make substantially rigid movement, and the rubber material deforms substantially to accommodate the shape change of composite sheet. As a result, composite sheet has good flexibility within said predetermined ranges of structure movements and is capable of achieving substantially smooth curvature of desirable shape just like ply sheet. When composite sheet deforms beyond said predetermined ranges, stiff objects start entering into locking position and the resistance to further structure movement, which is mainly contributed from stiff objects, increases significantly, and therefore, further structure movement is prevented. When cords present in present invention, they are usually covered by said stiff objects, and therefore, are shielded from direct contact with pointy or sharp edge external object. Said stiff object usually has large external surface through which moderate forces may be passed between stiff object and surrounding rubber at low to moderate stress level. When said stiff object is forced to contact with its adjacent stiff objects or the optional cords, large forces may be passed between them with very small strain increments. Said rubber material, which is filled in the gaps between adjacent stiff objects, has very low modulus and is capable of bearing large deformation. The aforementioned features of rubber keep the integrity of the whole structure and provide the flexibility to the structure before stiff objects enter into locking position. It is preferable to pre-treat the stiff object with coating or chemicals to increase its bond with rubber.

There are two means for confining the relative movements of adjacent rigid objects at predetermined positions. The first means is to make each rigid object having pair of substantially matching concave-convex surface as shown in FIG. 3a to 3e, and assemble them together. Said pair of substantially matching concave-convex surfaces forms the first means to allow the adjacent rigid objects to move easily within certain ranges because of the predetermined gaps between this pair of matching surfaces, and to confine further relative-movement when the limits of ranges are reached because of the effects of high contacts caused by the excessive movement between this pair of matching surfaces. Said first means can be used to confine the bending movement and the tension and compression between adjacent rigid objects. The second means is to make cords pass through rigid objects to form chain of objects as shown in FIG. 7e to 7f, and to fix some rigid objects on said cords. Said cords work together with the rigid objects fixing on said cords to form the second means. Said second means allows said chain of objects bend easily within certain ranges because of the predetermined gaps between potentially-contacted surfaces of adjacent rigid objects, and confines further bending of said chain when further bending of said chain causes significant tension inside said cords.

The ranges of flexibility of the composite sheet of present invention are controlled by the shape of said rigid objects and the gaps between each pair of adjacent rigid objects. Finite element analysis and other engineering analysis tools may be used to determine the shape of rigid objects and the gaps between each pair of adjacent rigid objects. The size of said rigid objects are selected to provide satisfactory smoothness to the shapes of composite sheet during composite sheet formation process and normal working condition.

The said stiff objects may be pre-assembled into chain of objects, and then, be made into composite sheet just like how cord is made into ply sheet by arranging a chain matrix extending substantially the entire length and width of the sheet. Said chain may be further filled with rubber into the gaps and be pre-cured before it is disposed in the composite sheet. The said rubber, which is used in the chain pre-curing process, may be or may not be the same rubber which is used to construct the whole composite sheet. One advantage of this chain pre-cure process is to better control the relative positions of said stiff objects. The said pre-assembled chain may further include at least one cord passing through each sub-piece of chain. The said cord constrains the stiff objects further to achieve the desirable characteristics of said chain of stiff objects.

It is an object of the present invention to disclosure a safety pneumatic tire wherein said composite sheet of the present invention is used.

The tire cross-section shown in FIG. 9 may have a high aspect ratio ranging between 0.65 and 2.0.

It is an object of present invention to disclose a novice composite sheet which can form a smooth double curvature surface of desirable shape easily and can endure large deformation at normal working condition and has high resistance to undesirable excessive deformation as well as high resistance to puncture and cut. The composite sheet of present invention shows highly non-linear behavior—its behavior is close to rubber when deformation of structure is within the predetermined ranges, and its behavior is close to rigid object when deformation of structure is outside said predetermined ranges. It may be used to build industry products within which ply sheet was used before. The composite sheet may be used to replace the ply sheet or to complement the ply sheet. Tire and pipe are examples of its applications. By carefully designing the size and shape of each stiff object and arranging the positions of said stiff objects, the composite sheet of present invention is flexible within predetermined ranges of structure movements and can be formed to a double curvature smooth surface of desirable shape easily. It also has, at least, one of the following characters when it is used in product:
1. it provides high resistance to the puncture load when it is used together with other components or independently in the industry products.
2. it is usually in relax status to the working load at normal working condition and it will enter into locking position to prevent the structure of product from totally collapse when product's normal load bearing mechanism fails for some reason.
3. it bears large compression load or bending.

It is also an object of present invention to disclose a method of making the composite sheet of present invention.

A method of making composite sheet of present invention comprising the following steps:
1. Determine the desirable shape of surface of composite sheet at normal working condition without working load (for tire, as an example, apply normal inflation pressure without tire load).
2. Subdivide the surface of desirable shape into grids along two major curvature directions. The sizes of the grids are determined by the curvatures of the surface at each location and deformation of structure at working load. It is preferable to keep the change of surface tangent between both ends of a grid less than three degree so that the composite sheet provides enough flexibility to the normal deformation of the structure. The width and length of stiff objects is directly related to the sizes of grids.
3. Determine the extreme shapes of surface of composite sheet at maximum possible working loads during the normal operation of the product.
4. Analyze the maximum relative movements between immediately adjacent grids at each grid location.
5. Determine the desirable working shape of surface of composite sheet in case normal load bearing mechanism fails.
6. Design the shape of each stiff objects and arrange their relative position so that following conditions are satisfied: a) composite sheet can be deformed easily to the desirable working shape, which was determined by step 1, during structure manufacturing phases; b) maximum relative movements between immediately adjacent grids, which are calculated in step 4, will not cause significant stress increase in stiff objects, so that the composite sheet contribute very small resistance to structure deformation during normal working condition; c) when normal load bearing mechanism fails, the locking position of composite sheet to working loads is close to the shape which was determined in step 5, so that composite sheet provides high resistance to further deformation of the structure and keep the structure stable to the preferred shape which was determined by step 5.
7. Perform engineering calculation and analysis to verify the design results. The main objective of this step is to check if the composite sheet has enough flexibility to provide low resistance to the desirable structure movements at normal working condition and to provide enough resistance to hold the structure to the desirable shape and support the working loads when other load bearing mechanism failed. Reiterate step 2 through step 7 until satisfactory design is achieved.
8. Perform general shape analysis and structure optimization on stiff object. The main objective of this step is to define the stiff objects which are strong enough to bear the possible maximum relative movement between adjacent stiff objects and possible puncture loads.

It is also an object of the present invention to disclose a safety tire wherein said composite sheet of present invention is used.

The tire of present invention may be used for any working condition in which pneumatic tire is used. It is the inventors' primary goal to improve the safety of tire. It is the inventors' secondary goal to improve the performance, durability and economy of tire. The inventors achieved these goals by utilizing the unique features of said composite sheet of present invention in tire. Comparing with conventional tires, the tire of present invention has comparable riding comfortness, substantially higher puncture/cut resistance and higher loading capacity. And, the most importantly, it still provides good vehicle maneuverability to avoid fatal accident when tire suddenly loses its inflation pressure for some reasons.

The tire of present invention is a self-supporting tire under zero inflation pressure condition, and the maximum reduction of its section height is less than 80 percent of its section height under normal inflation pressure without working load.

When tire losses its inflation pressure, tire deflects to a predetermined shape which is closely related to the locking positions of said composite sheets. As demonstrated in FIG. 9, a pair of composite sheets of present invention 107 is disposed under carcass extending from belt ending to bead core. Said pair of composite sheet enters into locking position and mobilizes its high resistance to further bending to prevent tire's sidewall from collapsing when tire lost its inflation pressure.

The tire of present invention may work with regular rim. For some embodiments of present invention, it may need minor modification to regular rim for mounting purpose.

Other advantages of present invention include: making a tire that has substantially higher lateral spring coefficient and rotational stiffness which provide vehicle good response to steering, accelerating and breaking; making a tire which has very small reduction of section height when it lost inflation pressure, so that said tire can be used to replace solid tire; making heavy tire with reduced thickness of sidewall but higher bending stiffness; making a tire which has significantly lower operational inflation pressure to achieve superior performance for some special needs, like higher road tracking, special air-dynamic characteristics; make a tire or pipe with extremely high burst pressure.

DESCRIPTION OF DRAWING

The accompanied drawings show for the purpose of exemplification, without limiting the invention or the followed disclosures of the applications of present inventions wherein:

FIG. 1-a shows a 3D-view of a schematic drawing of composite sheet of present invention. FIG. 1-b shows a top view of same schematic drawing of composite sheet of present invention. FIG. 1-c shows a front view of same schematic drawing of composite sheet of present invention.

FIG. 2a, 2b, 2c, 2d show some embodiments of the shapes of stiff objects.

FIGS. 3-a, 3-b, 3-c, 3-d and 3-e show different views of some parts of an embodiment of composite sheet.

FIG. 4-a shows a cross-section view of an embodiment of composite sheet. FIG. 4-b shows a partial view of same embodiment of composite sheet along the direction which is perpendicular to the view shown in FIG. 4-a.

FIG. 5-a shows a cross-section view of another embodiment of composite sheet. FIG. 5-b shows a partial view of same embodiment of composite sheet along the direction which is perpendicular to the view shown in FIG. 5-a.

FIG. 6-a shows a cross-section view of another embodiment of composite sheet. FIG. 6-b shows a partial view of same embodiment of composite sheet along the direction which is perpendicular to the view shown in FIG. 5-a.

FIG. 7-a shows 3D views of a stiff object which is described in FIG. 4-a. FIG. 7-b shows 3D views of a chain of stiff objects which is described in FIG. 4-a.

FIG. 7-c shows 3D views of a stiff object which is described in FIG. 5-a. FIG. 7-d shows 3D views of a chain of stiff objects which is described in FIG. 5-a.

FIG. 7-e shows 3D views of a stiff object which is described in FIG. 6-a. FIG. 7-f shows 3D views of a chain of stiff objects which is described in FIG. 6-a.

FIG. 8 shows a cross-section view of a tire in prior art.

FIG. 10-a shows a cross-section view of novice composite sheets in an embodiment of tire of present invention. FIG. 10-b shows an enlarge portion of drawing FIG. 10-a in "Area A".

FIGS. 13-a, 13-b, 14-a, 14-b and 14-c show several different views of stiff objects used in an embodiment of composite sheet.

DETAILED DESCRIPTION AND PREFERRED EMBODIMENTS

Figure 9:
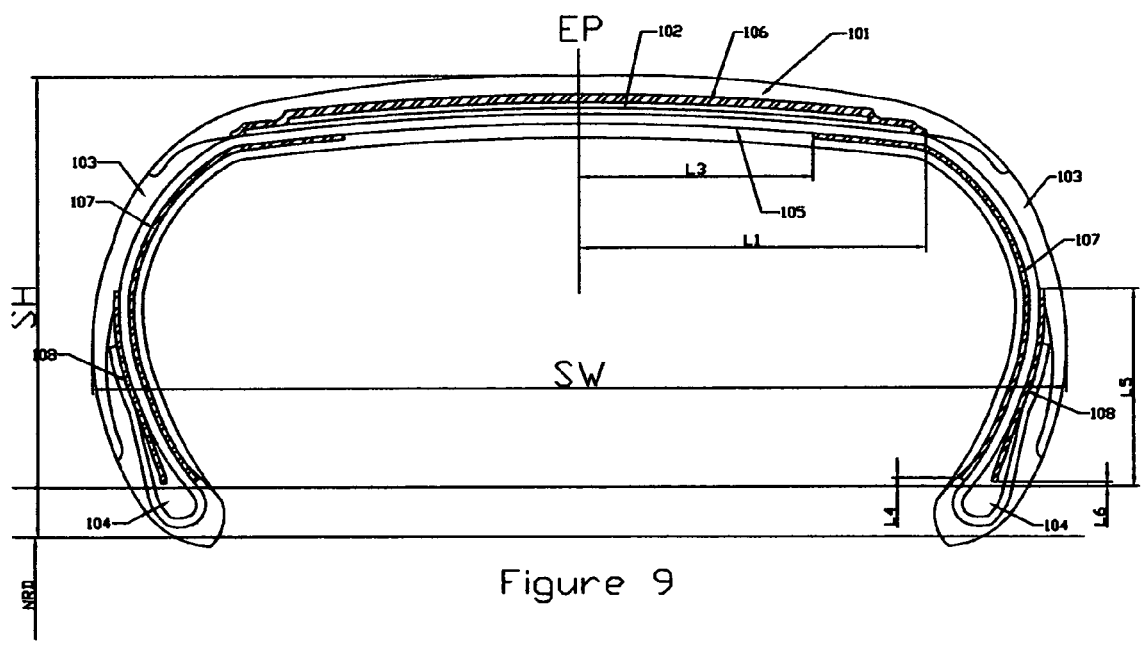
FIG. 9 shows a cross-section view of a tire according to present invention.

In FIG. 1-a, 1 is stiff object, 2 is cord which is optionally presented in composite sheet, 3 is rubber material, 4 represents the bounding box of stiff object 1. In FIGS. 1-a, 1-b and 1-c, the details of the shape of stiff object 1 are ignored and, stiff object is represented by its bounding box 4 to indicate the position in composite sheet. Stiff objects may have any shapes and each piece may or may not be the same size. FIG. 2a, 2b, 2c, 2d are some embodiments of the shapes of stiff objects. The bounding box (4) of stiff object describes the maximum dimensions of stiff object along three major directions (thickness direction, row direction and column direction). Each bounding box has a distance Dr to its adjacent bounding box in same row and has a distance Dc to its adjacent bounding box in same column. To different stiff object, the value of Dr (and/or Dc) may or may not be the same. The values of Dr and Dc may be positive, or, negative. The negative value means that the stiff object is overlapped with its adjacent stiff object, or, the stiff object partially encapsulates its adjacent stiff object. Each row of stiff objects is substantially parallel to each other. The optional cords are substantially parallel to each other. The direction of cords may have an angle ANGLE1 with the direction of row of stiff objects. The cords have a distance Dc-m to the top surface of bounding box 4. The value of Dc-m may be positive, or, negative. The negative value means that the stiff objects may partially or fully encapsulates the cords.

In FIG. 2-a, Tmax is stiff object's maximum dimension along the thickness direction of the composite sheet. Lmax is stiff object's maximum dimension along the direction of row of stiff objects. Wmax is stiff object's maximum dimension along the direction of column of stiff objects. In this embodiment, the stiff object has concave shape at one end and convex shape at the other end. Stiff objects are assembled into chains through these pairs of concave-convex contact surfaces between adjacent stiff objects as shown in FIG. 3-a. Said chain of stiff objects may include any number of stiff object, and each stiff object in the same chain may have same size and shape or may have different size and shape. It is preferable that every chain (of stiff objects) is identical and is disposed substantially parallel to each other inside composite sheet just like how cords are disposed in ply sheet. Rubber fills in the gap and embeds stiff objects to form smooth surface of composite sheet. In this embodiment of composite sheet, value of Dr is negative and value of Dc is positive. The structure and behavior of said chain of rigid objects has similarity to human spine. It has broad ranges of flexibility, but certain structural movements are prevented because of the interlocking between adjacent rigid objects. FIG. 3-c shows the locking position of two connected stiff object against the upward bending. FIG. 3-b shows the locking position of two connected stiff objects against downward bending. FIG. 3-d shows a 3D view of two connected stiff objects in current embodiment. FIG. 3-e shows a 3D view of a stiff object in current embodiment and its bounding box which describes its dimensions. This embodiment of composite sheet has very low tensile stiffness along the column direction (the direction which is perpendicular to the direction of chain of stiff objects) and is very flexible along the column direction. Current embodiment of composite sheet is very flexible along the row direction (the direction of chain of stiff objects) before stiff objects reach the locking positions and it become very hard to bend further after stiff objects reach to their locking position. Current embodiment of composite sheet can be used in tire, or, similar structure. When this embodiment of composite sheet is used in tire, its row direction is preferable to be substantially parallel to the radial direction of tire or to the circumferential direction of tire.

FIG. 2-b, FIG. 2-c and FIG. 2-d show 3D-views of some other examples of stiff objects having through-hole(s) in their bodies. They are used together with cords in the embodiments of the composite sheet. FIG. 7b, 7d, 7f show the 3D-views of chain of rigid objects made by above examples, respectively. Among this type of composite sheets, the cords are passing through each rigid objects and are fix with some of the rigid objects. Those rigid objects fixing on cords separate the chain into multiple segments, and each segment of chain can achieve an arc-shape locking position under certain bending load. Therefore, the whole chain of rigid objects cam achieve multi-arc-shape locking position under certain bending load. Several key factors contribute to the behavior of this type of composite sheet. Among those factors are the curvature of the surface of rigid object at contact area, the relative distance between the center of contact point and passing cord, the initial gaps between each adjacent rigid objects, as well as the properties of rubber and cord and rigid object. Finite element analysis or other engineering calculation are needed in order to get optimized structural-configuration which has desirable locking shape and load bearing capacity to satisfy the engineering requirements.

FIG. 4-a shows a cross-section view of an embodiment of composite sheet which comprises a matrix of stiff objects, a matrix of cords and rubber. the shape of said stiff object is a bead (a ball with a hole passing through the center of ball). A cord passes through the holes of balls to form a chain of stiff beads. Rubber fills in the gap between beads and cord and embeds the beads and cord. The cord has some means to prevent the end-beads in a chain from sliding out. some examples of said means are welding the end-beads to cord, setting stoppers on cords, or, casting bead on cord. Said chains of beads are disposed substantially parallel to each other inside current embodiment of composite sheet. FIG. 4-b shows a partial view of current embodiment of composite sheet along the direction which is perpendicular to the view shown in FIG. 4-a. it only for the purpose of identifying the shape and relative position of each component in composite sheet. In current embodiment, stiff beads within a chain can make substantially rigid movements before the cord, which is passing through said beads, generates substantial tension. When said beads' movements cause significant tension in cord, the cord start confining the further movements of beads. The chain of stiff bead may achieve significantly different mechanical characteristics by selecting different types of cords and different radii of stiff balls. The inextensible steel cord will hold the shape of chain of beads still after cord generates significant tension. On the other end, Nylon cord or other cord which has relative lower tensile modulus can make the chain of metal beads behave like a spring after significant tension is generated in cord.

FIG. 5-a shows a cross-section view of another embodiment of composite sheet which comprises a matrix of stiff objects, a matrix of cords and rubber. Current embodiment is a modification of the embodiment described in FIGS. 4-a and 4-b. the only difference between current embodiment and the embodiment described in FIG. 4-a is the shape of stiff object. In current embodiment, the stiff object has a drum-like external surface instead of a sphere surface. In the potential contact area between stiff objects, it still keeps the same ball-shape as the bead which was described in FIG. 4-b. in the area where is away from potential contact area, stiff object of current embodiment has much flatter shape than the original ball-shape. This modification of the shape of stiff object make the current embodiment has very similar property as the embodiment described in FIG. 4-a, but different thickness and weight. FIG. 5-b shows a partial view of current embodiment of composite sheet along the direction which is perpendicular to the view shown in FIG. 5-a. it only for the purpose of identifying the shape and relative position of each component in composite sheet.

FIG. 6-a shows a cross-section view of another embodiment of composite sheet which comprises a matrix of stiff objects, a matrix of cords and rubber. Current embodiment is a modification of the embodiment described in FIGS. 5-a and 5-b. the stiff object of current embodiment is obtained by extruding a surface along its width direction. In the potential contact area between stiff objects, it has cylinder shape in stead of ball-shape which was used in the embodiment described by FIGS. 5-a and 5-b. said stiff object may have more than one through-holes which allow cords to pass through. This modification of the shape of stiff object makes the current embodiment greatly increase the in-plane torsional stiffness of composite sheet. FIG. 6-b shows a partial view of current embodiment of composite sheet along the direction which is perpendicular to the view shown in FIG. 6-a. it only for the purpose of identifying the shape and relative position of each component in composite sheet.

In FIG. 8, 101 is tread component. 102 is belt package component. 103 are sidewall components. 104 are bead core components. 105 is carcass component. EP is Equatorial Plane. SH is Section Height of tire. SW is Section Width of tire.

FIG. 9 shows a cross-section view of tire according to present invention. 106, 107 and 108 are novice composite sheets according to current invention, and, they are disposed to different locations within tire to improve the performance of tire. Composite sheet 106, 107 and 108 may be used independently, or, be used in combinations. The upper end of composite sheet 107 has a distance L3 to the EP. When L3 equals zero, composite sheet 107 becomes one continuous sheet extending from left bead core to right bead core. The lower end of composite sheet 107 has a distance L4 to the top surface of bead core. Composite sheet 107 may further extend its lower end and wrap around the bead core. The upper end of composite sheet 108 has a distance L5 to the top surface of bead core. The lower end of composite sheet 108 has a distance L6 to the top surface of bead core. Composite sheet 108 may further extend its lower end and wrap around the bead core. Composite sheet 106 is used to improve puncture/cut resistance and to bear compression along radial direction of tire at normal working condition and at zero inflation pressure condition. Composite sheet 107 is used to support tire's sidewall at zero inflation pressure condition. Composite sheet 108 has substantially high in-plane torsional stiffness and is used to improve tire performance during accelerating or braking period. It is especially useful on the drive tire for heavy load vehicles. Other benefits may be achieved by further customizing the composite sheet 106, 107 and 108, such as, substantial increment of burst pressure of tire, substantial decrement of operating inflation pressure of tire.

In FIG. 10-*a*, Composite sheet 107 comprises stiff objects, cords and rubber. Said cords are inextensible steel cords. Said stiff objects are chained by said cords and the chains of stiff objects are disposed substantially parallel to each other in tire's radial direction. Said stiff object has a shape which is defined in FIG. 7-*c*. FIG. 10-*b* shows an enlarge portion of drawing FIG. 10-*a* in "Area A". Stiff objects 1, which are chained by cord 2, are fully embedded in rubber 3. Composite sheet 106 is similar to composite sheet 107 in its structure that comprises stiff objects, cords and rubber. The direction of chains of stiff objects in composite sheet 106 is disposed in circumferential direction that is substantially parallel to tire Equatorial line. Stiff objects in composite sheet 106 have a shape which is defined in FIG. 7-*e*. In current embodiment, the composite sheet 106 is constructed by winding up a continuous composite strip outside belt package along tire circumferential direction just like how spiral overlay is constructed in tire. Said continuous composite strip includes only one or two chained stiff objects that are fully embedded in rubber. composite sheet 106 has high in-plane torsional stiffness which improves tire performance at cornering condition. Composite sheet 108 comprises stiff objects, cords and rubber. said stiff objects have the shape which is defined in FIG. 7-*e* and are chained by cords. said chains of stiff objects are disposed along tire's radial direction and are substantially parallel to each other. Composite sheet 108 has high in-plane torsional stiffness which improves tire's performance at braking and accelerating condition.

Figure 11:
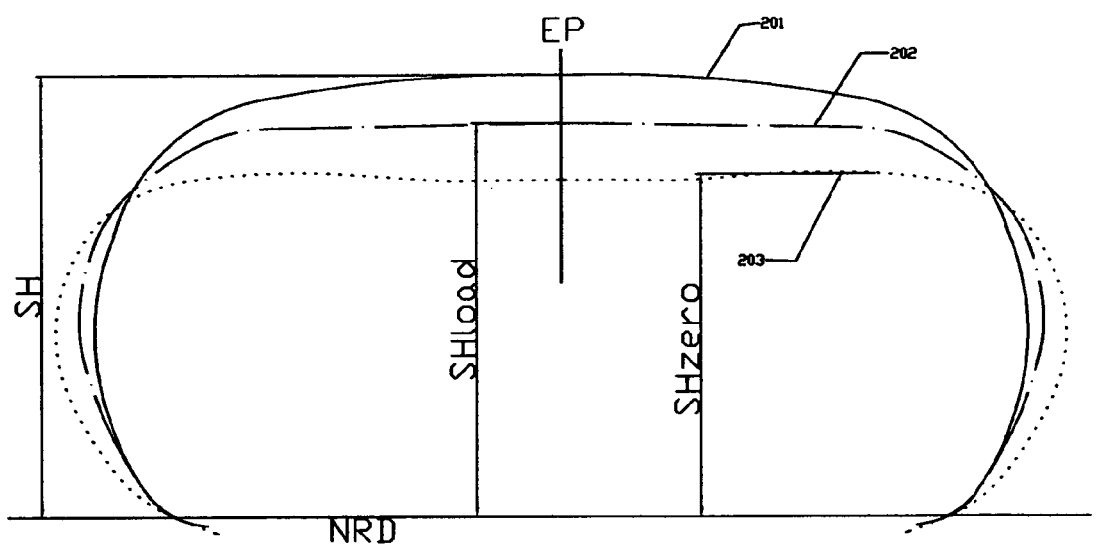
FIG. 11 shows the shape of outline curve of a tire embodiment at different loading conditions in tire's cross-section view.
Figure 12:
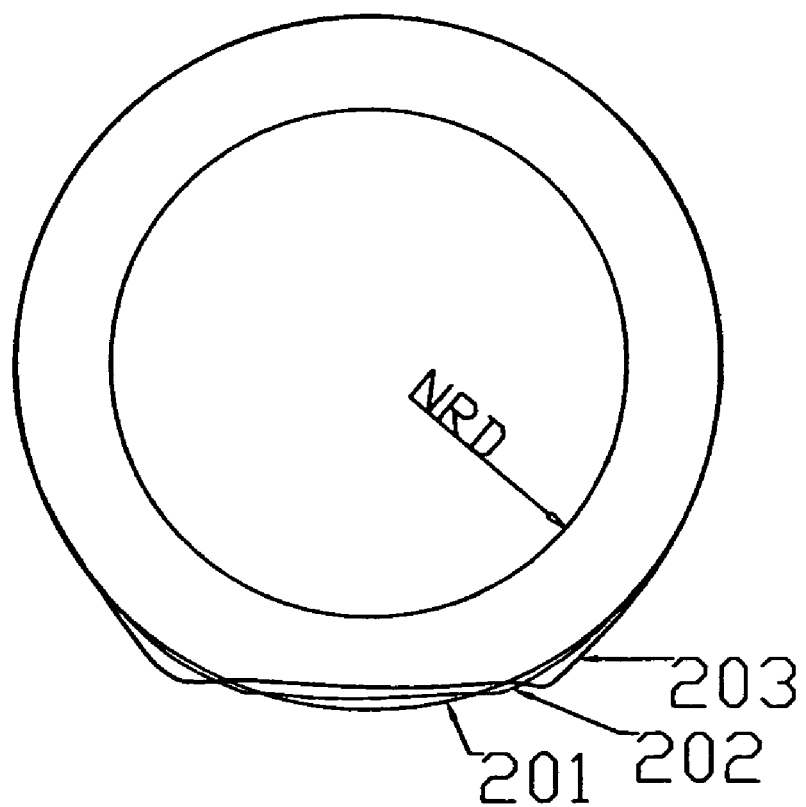
FIG. 12 shows the shape of outline curve of same tire embodiment in tire Equatorial Plane.

FIG. 11 and FIG. 12 show the shape of current embodiment's outline curve at different loading conditions. FIG. 11 shows said outline curves in tire's cross-section view. FIG. 12 shows the curves in tire Equatorial Plane. 201 is tire's outline curve at normal inflation pressure without load. 202 is tire's outline curve at normal inflation pressure with maximum carrying load. 203 is tire's outline curve at zero inflation pressure with maximum carrying load. Tire keeps section height SH at normal inflation pressure without load. Tire's section height SHload at normal inflation pressure with maximum carry load is usually above seventy-five percent of SH. SHzero is tire's section height at zero inflation with maximum carry load. The SHzero value in Current embodiment is greater than sixty-five percent of SH. It is preferable to have SHzero greater than fifty percent of SH. Current embodiment achieves stable shape 203 at zero inflation pressure by designing the locking positions/shapes of composite sheets 106, 107 and 108 close to the shape described by 203. the chains of stiff objects used in composite sheet 107 has a locking shape, which is close to the sidewall portion of curve 203 which is shown in FIG. 11, against vertical load.

The sizes of said stiff objects are determined according to the working shape of chain of stiff objects. If single size is used in chain of stiff objects, the smallest size should select to assure that tire is capable of maintaining desirable shapes under different working conditions. After size of stiff object is determined, the locking shape of said chain of stiff objects can be determined by length of cord and the radius of contact surface. By assuming stiff object is a rigid body and cord is an inextensible and totally flexible string, the locking shape of said chain of stiff objects can be calculated mathematically. In current embodiment, the relative movements between adjacent stiff objects are not confined solely by stiff objects themselves but with the help from cord. Fixing certain stiff objects on cord at right location becomes an important method to control the locking shape of said chain of stiff objects. If identical stiff objects are used in said chain of stiff objects, the segment of chain, which has end stiff objects fixed on cord, can only achieve an arc-shaped locking shape of chain. If the desirable locking shape of chain of stiff objects can not be described by one arc, the desirable locking shape of stiff objects should be subdivided into multiple segments which can be represented by an arc with satisfactory accuracy individually. And then, groups the stiff objects in said chain according to aforementioned multiple segments and fixes the end stiff objects in each group at right positions to achieve each arc-shaped locking shape individually for each segment of chain of stiff objects. An experimental method of determining the correct length of cord which makes the chain of stiff objects an arc-shaped locking shape may be described as followed: 1) fix the leading stiff object on cord; 2) push following stiff objects tightly against the leading stiff object to make a straight chain of stiff objects with close contacts between adjacent stiff objects; 3) hold the leading stiff object and bend the other end of said straight chain of stiff objects to achieve the desirable arc shape without losing the close contacts between adjacent stiff objects; 4) fix the last stiff object on cord; 5) make the chain of stiff objects straight again and measure the distance between the leading stiff object and the last stiff object. The said measured distance is the length of cord which makes the said chain a desirable locking shape.

FIGS. 13-*a*, 13-*b*, 14-*a*, 14-*b* and 14-*c* show several different views of stiff objects used in an embodiment of composite sheet. Current embodiment has extremely high puncture resistance and can hold substantially high inflation pressure when it is used in tire or similar products. FIG. 13-*b* shows a 3D-view of said stiff object. Said stiff object has a drum-shaped lower body plus a wing-shaped upper body part. A through-hole passes through the drum-shaped body part of said stiff object. Cord passes through said holes to chain said stiff objects together. Said drum-shaped body part of stiff object has ball-shaped surfaces at both ends which contact adjacent stiff objects in the same chain. Said wing-shaped body part of stiff object do not contact other stiff objects and it is designed to create overlap with its adjacent chain of stiff objects. Each chain of stiff object has same geometric shape, but two adjacent chains are disposed in reversed orientations. FIG. 13-*a* show a 3D-view of a matrix of stiff objects in current embodiment. FIG. 14-*a* shows a front-view of said stiff object. FIG. 14-*b* shows a left-view of same said stiff object. FIG. 14-*c* shows a top-view of same said stiff object. An embodiment of tire use current embodiment of composite sheet as composite sheet 106 and composite sheet 107, which are described in FIG. 9, to create a flatless tire with extremely high puncture resistance and substantially high burst pressure. In said composite sheet 106, the rubber material which is located between wing-shaped bodies and drum-shaped bodies is about fully confined by stiff objects. Because of rubber's impressible nature, current special configuration of composite sheet gives current composite sheet substantially high compressive stiffness against the compression along tire's radial direction.

All the drawings of embodiments are for demonstration purpose. Engineer knowledge may be applied to make minor modifications of the shape of solid objects displayed in drawings, such as filleting edges of body to reduce stress concentration.

What is claimed is:

1. A safety pneumatic tire which is self-supporting under zero inflation pressure, comprising:

a pair of left and right bead cores;

a carcass structure extending between the bead cores and wrapping about each bead core;

a tread layer disposed at an outermost position of the tire ending in left and right shoulders;

a belt package disposed at an outer side of said carcass structure and extending under said tread layer from shoulder to shoulder;

a pair of sidewall portions disposed at the left and right of said tread portion extending from tread shoulder to bead core; and a pair of left and right composite sheets disposed underneath said carcass structure extending from bead core to belt end and terminating before reaching the tire equatorial plane, each said composite sheet comprising a matrix of high modulus solid objects extending substantially the entire length and width of the composite sheet and embedded in a low modulus material, said high modulus solid objects being assembled into a plurality of chains, said plurality of chains being disposed substantially parallel to each other and substantially in the radial direction of the tire, each chain having at least one cord passing through each object of the chain, wherein said pair of composite sheets support the tire when the tire operates under zero inflation pressure such that the maximum reduction of the tire's section height is less than 80% of the tire's section height at normal inflation pressure without load.

2. The safety pneumatic tire of claim 1 wherein said low modulus material is rubber.

3. The safety pneumatic tire of claim 1 wherein each of said pair of composite sheets terminates radially above the top surface of the respective bead core.

4. The safety pneumatic tire of claim 1 wherein each of said pair of composite sheets extends radially inward and wraps around the respective bead core.

5. The safety pneumatic tire of claim 1 wherein the maximum reduction of the tire's section height is less than 35% of the tire's section height at normal inflation pressure without load.

6. The safety pneumatic tire of claim 1 wherein the tire has a high aspect ratio ranging between 0.65 and 2.0.

7. The safety pneumatic tire of claim 1 wherein said at least one cord is at least one inextensible steel cord.

8. The safety pneumatic tire of claim 1, further comprising:
a composite sheet disposed between said belt package and said tread layer, said composite sheet comprising a matrix of high modulus solid objects extending substantially the entire length and width of the composite sheet and embedded in a low modulus material, said high modulus solid objects being assembled into a chain in the form of a continuous composite spirally wound strip, the spiral windings of said chain being disposed substantially parallel to each other and substantially in the circumferential direction of the tire, each chain having at least one cord passing through each object of the chain.

9. The safety pneumatic tire of claim 8 wherein said low modulus material is rubber.

* * * * *